United States Patent
Haywood et al.

(10) Patent No.: US 8,046,423 B2
(45) Date of Patent: Oct. 25, 2011

(54) MEMORY OVERLOAD PROTECTION

(75) Inventors: Thomas D. Haywood, Research Triangle Park, NC (US); Brian K. Smith, Research Triangle Park, NC (US); Michael J. Spreitzer, Hawthorne, NY (US); Lan Vuong, Durham, NC (US); Hai Shan Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 12/473,313

(22) Filed: May 28, 2009

(65) Prior Publication Data

US 2010/0306390 A1    Dec. 2, 2010

(51) Int. Cl.
  *G06F 15/16* (2006.01)
  *G06F 15/167* (2006.01)
(52) U.S. Cl. ......... 709/214; 709/233
(58) Field of Classification Search ......... 709/228, 709/212, 213, 214, 215, 216, 227, 229, 233
  See application file for complete search history.

(56) References Cited

U.S. PATENT DOCUMENTS

| | | | |
|---|---|---|---|
| 2002/0053029 A1* | 5/2002 | Nakamura et al. | 713/201 |
| 2002/0120767 A1* | 8/2002 | Oottamakorn et al. | 709/235 |
| 2004/0004939 A1* | 1/2004 | Yegenoglu | 370/252 |
| 2004/0010577 A1* | 1/2004 | Yegenoglu | 709/223 |

OTHER PUBLICATIONS

Xu et al., "Regulating Workload in J2EE Application Servers", pp. 1-5, Pub. date Apr. 2006.

* cited by examiner

*Primary Examiner* — Patrice Winder
*Assistant Examiner* — Ebrahim Golabbakhsh
(74) *Attorney, Agent, or Firm* — Jeanine S. Ray-Yarletts; A. Bruce Clay

(57) ABSTRACT

A method, system and program product for controlling memory overload for a computer system. The invention determines heap utilization of a server; determines a maximum session lifetime a configured percentile of at least one session; determines a traffic rate (comprised of an average traffic rate received from a proxy server and a variance of traffic rate received from a proxy server); and calculates a maximum traffic rate, wherein the maximum traffic rate determines the heap utilization at a maximum heap percentage.

20 Claims, 4 Drawing Sheets

MEMORY OVERLOAD PROTECTION

FIELD OF THE INVENTION

The present invention relates generally to memory overload protection, and more particularly to optimizing heap utilization by measuring and controlling the traffic rate.

BACKGROUND OF THE INVENTION

In a typical computer system topology, a proxy server receives work and forwards that work to a server. If a traffic rate, the rate at which proxy server sends work to server, is too rapid, server can run out of one or more resources required to perform work. If traffic rate is too slow, throughput can be suboptimal. An alternation between too rapid and too slow subjects server to erratic work flow creating difficulties for optimizing heap utilization.

One requirement of memory overload protection is that proxy server must not forward work to server too quickly. Otherwise an out-of-memory exception may occur.

Another requirement of memory overload protection is that proxy server must forward work to server quickly enough in order to make good use of the memory resources of server. Further, overall throughput to server must not be too erratic.

SUMMARY OF THE INVENTION

The present invention provides a method, system and program product for memory overload protection.

In a first aspect, the invention provides a memory overload protection system, including a computer hardware device comprising: a memory sensor system for determining a heap utilization of a server; a session monitor system for determining a maximum session lifetime a configured percentile of at least one session; a speedometer system for determining a traffic rate, wherein the traffic rate is comprised of an average traffic rate received from the proxy server and a variance of traffic rate received from the proxy server; and a memory overload controller for determining a maximum traffic rate, wherein the maximum traffic rate results in the heap utilization at a maximum heap percentage.

In a second aspect, the invention provides a method for memory overload protection, using at least one computer hardware device for performing the steps of: determining a heap utilization of a server; determining a maximum session lifetime a configured percentile of at least one session; determining a traffic rate, wherein the traffic rate is comprised of an average traffic rate received from the proxy server and a variance of traffic rate received from the proxy server; and determining a relationship between the traffic rate and the heap utilization, wherein the determining generates a maximum traffic rate, wherein the maximum traffic rate results in the heap utilization at a maximum heap percentage.

In a third aspect, the invention provides a program product for memory overload protection, comprising: program code for determining a heap utilization of a server; program code for determining a maximum session lifetime a configured percentile of at least one session; program code for determining a traffic rate, wherein the traffic rate is comprised of an average traffic rate received from the proxy server and a variance of traffic rate received from the proxy server; and program code for determining a maximum traffic rate, wherein the maximum traffic rate results in the heap utilization at a maximum heap percentage.

In a fourth aspect, the invention provides a method for deploying an application for providing memory overload protection, comprising: providing a computer infrastructure being operable to: determine a heap utilization of a server; determine a maximum session lifetime a configured percentile of at least one session; determine a traffic rate over the maximum session lifetime, wherein the traffic rate is comprised of an average traffic rate received from the proxy server and a variance of traffic rate received from the proxy server; and determine a relationship between the traffic rate and the heap utilization, wherein the determining generates a maximum traffic rate, wherein the maximum traffic rate results in the heap utilization at a maximum heap percentage.

The illustrative aspects of the present invention are designed to address at least one of the problems herein described and other problems not discussed.

BRIEF DESCRIPTION OF THE DRAWINGS

The above and other objects, features and advantages of the invention will be better understood by reading the following more particular description of the invention in conjunction with the accompanying drawings.

Figure 1:
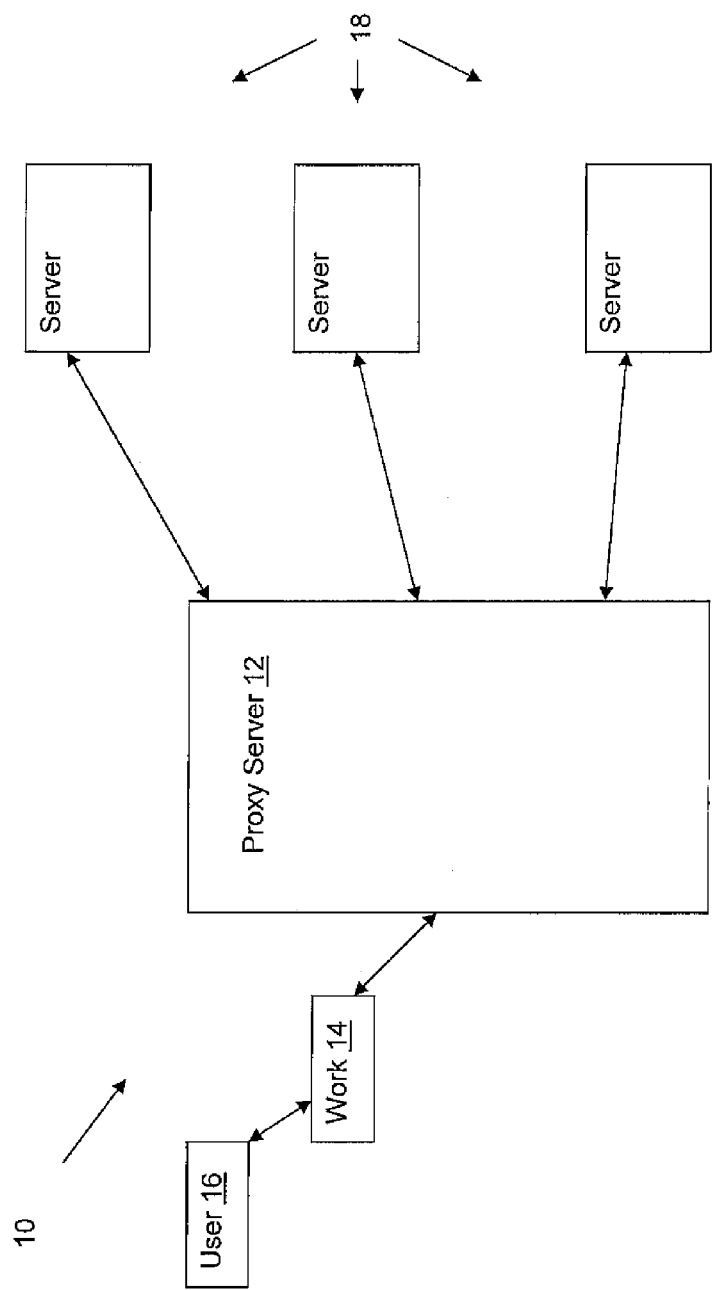
FIG. 1 depicts one embodiment of a computer system topology in accordance with the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

FIG. 1 shows one embodiment of a computer system topology 10 having a proxy server 12 and a plurality of servers 18 in accordance with the present invention. A proxy server 12 is a computer system or an application program that acts as an intermediary for requests from at least one user 16 or other source seeking resources from at least one server other than the proxy server 12. For example, other source may include a computer device, a communications device, or any other person or device configured to transmit work 14. FIG. 1 illustrates three servers. However, a person skilled in the art will recognize that the computer system topology 10 may be implemented with the proxy server 12 servicing many different numbers of servers and this disclosure is not intended to limit such potential embodiments. User 16 sends work 14 to the proxy server 12. Work 14 may include requesting, for example, a file, a connection, a web page, or another resource, available from at least one server. Proxy server 12 may evaluate work 14 according to filtering rules. For example, it may filter traffic by IP address or protocol. If the request is validated by filter, proxy server 12 provides a resource in response to the request by connecting to at least one server 18 and requesting a resource. Proxy server 12 may alter the user's request or server's response. Proxy server 12 may provide a response to a request without contacting the server.

Figure 2:
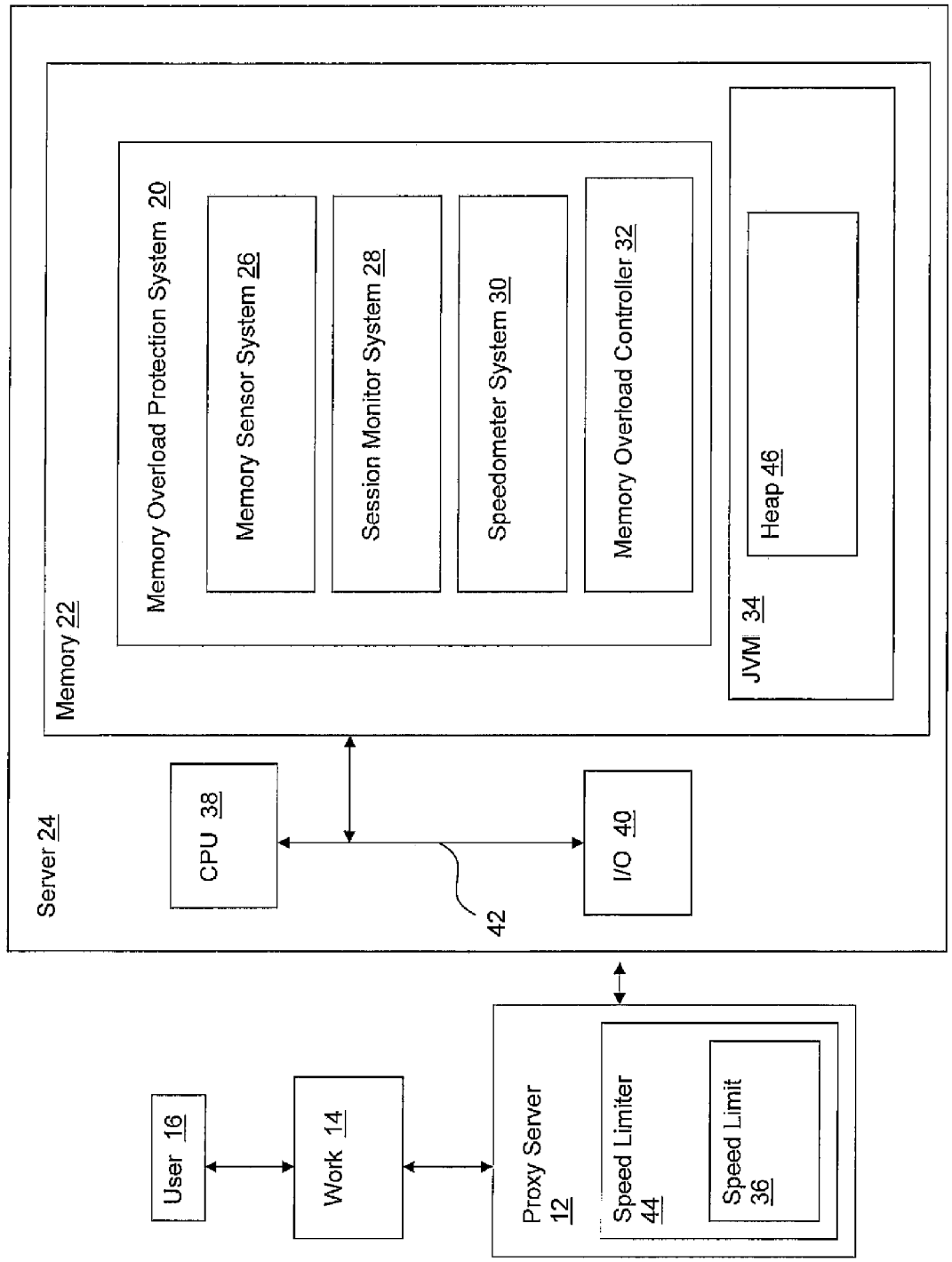
FIG. 2 depicts one embodiment of a memory overload protection system in accordance with the present invention.

FIG. 2 shows one embodiment of the invention. Memory overload protection system 20 may be implemented as a software program product that can be stored in memory 22 and be executed on any type of computer system. In FIG. 2, memory overload system 20 resides on a server 24. Memory 22 may include a Java™ virtual machine (JVM) 34 from Sun Microsystems, Inc. However, a person skilled in the art will recognize that the invention may be implemented on any type of computer system and this disclosure is not intended to limit such potential embodiments. Memory overload protection system 20 may include a memory sensor system 26; session monitor system 28; speedometer system 30; and memory overload controller 32.

In one embodiment of the invention, server 24 is configured with a maximum heap percentage, where a heap 46 is the amount of non-native memory allocated to a JVM 34. Maximum heap percentage is the maximum percentage of heap 46 that can be used by the server 24. In addition, proxy server 12 is provided with a speed limiter 44 that controls a speed limit 36 per server 24 and thereby regulates a traffic rate—the rate at which the proxy server 12 forwards work 14 to server 24. If the traffic rate exceeds speed limit 36, proxy server 12 may either suspend or reject work 14.

Server 24 is responsible for setting speed limit 36 for proxy server 12 that is sending work to server 24. Server 24 calculates speed limit 36 by monitoring a change in heap utilization as traffic rate changes. Various data points in which "X"="traffic rate" and "Y"="heap utilization" are determined. A linear regression is used to determine a relationship between traffic rate and heap utilization. A maximum traffic rate that traffic should be sent to server 24 is determined and is set as speed limit 36 in proxy server 12.

A memory sensor system 26 is provided that determines a heap utilization of server 24. A person skilled in the art will readily recognize that as the accuracy of the memory sensor system 26 improves the performance of the memory overload protection improves in a corresponding manner. An accurate reading of non-garbage memory can be determined using standard Java™ application programming interfaces (API) after a global garbage collection (GC). The Java™ virtual machine tool interface (JVMTI) is used to determine when a global GC has completed. (For example: using the JVMTI_EVENT_GARBAGE_COLLECTION_FINISH JVMTI event.) When global GC has completed, the amount of non-garbage memory in use is calculated as Runtime.getRuntime( ).totalMemory( )−Runtime.getRuntime( ).freeMemory( ).

A session monitor system 28 is provided that determines a maximum session lifetime of a configured percentile of at least one session. "Session" refers generically to HTTP sessions, session initiation protocol (SIP) dialogs, application sessions, or any similar structure. (For example, if maximum session lifetime reports a maximum lifetime of 95% of all sessions and if 95% of the sessions are less than 3 minutes, then maximum session lifetime is 3 minutes.)

A speedometer system 30 is provided that reports traffic rate. Traffic rate is comprised of an average traffic rate received from proxy server 12 and a variance of traffic rate received from proxy server 12 over the maximum session lifetime as reported by the session monitor system 28. Proxy server 12 contains speed limit 36 for server 24 to which it forwards work 14. The speed limit 36 controls the traffic rate.

A memory overload controller 32 (MOC) is provided at server 24. It should be recognized that FIG. 2 is one illustrated embodiment and that MOC 32 may reside on a separate server. Initially, MOC 32 sets speed limit 36 at a low value while it determines a traffic rate/heap utilization relationship. MOC 32 allows work 14 through until it can calculate a minimum number of data points ("minDataPoints"), e.g.: minDataPoints>=2. MOC 32 calculates a data point correlating traffic rate to heap utilization when:
(a) the memory sensor system 26 notifies it that the heap utilization has changed,
(b) the speedometer system 30 reports a steady traffic rate for a time>=maximum session lifetime. (For example, steady traffic rate may include a low variance of traffic rate/average traffic rate ratio), and
(c) the speedometer system 30 reports no traffic rate change for a time>=maximum session lifetime.

MOC 32 uses a minimum number of data points and a linear regression to calculate a traffic rate/heap utilization slope, using either the latest fixed number of data points or a half-life algorithm to weight recent data points more heavily. MOC 32 calculates a heap utilization offset. Heap utilization offset is the amount of heap utilization when traffic rate is zero. Given heap utilization offset, traffic rate/heap utilization slope, traffic rate, and heap utilization, MOC 32 calculates the maximum traffic rate that will result in maximum heap percentage being used by server 24, and sets the maximum traffic rate as the speed limit 36. If the memory sensor system 26 notifies MOC 32 that heap utilization>maximum heap percentage, then MOC 32 decreases maximum traffic rate for the speed limit 36. MOC 32 will continue to decrease maximum traffic rate with each memory sensor system 26 notification until heap utilization begins to decrease.

Figure 3:
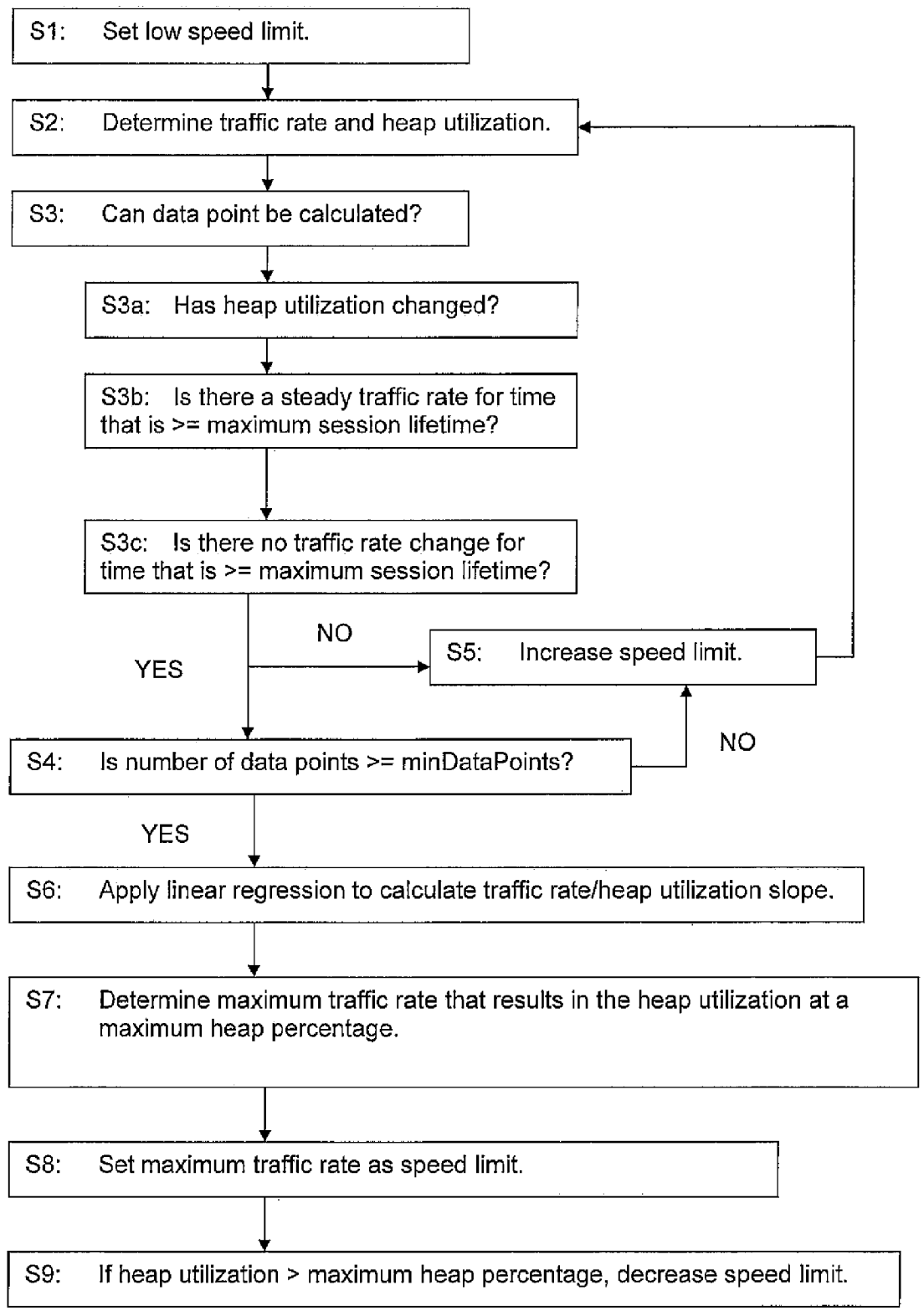
FIG. 3 is a flow chart of the main steps for memory overload protection in accordance with the present invention.

Referring to FIG. 3, the process of memory overload control in one embodiment of the invention is described. The process starts with setting a low speed limit 36 for the work 14 flow (S1). Next, traffic rate and corresponding heap utilization are determined (S2). A series of determinations are then made, including: "Can a data point be calculated?" (S3); "Has the heap utilization changed?" (S3a); "Is there a steady traffic rate for a time that is greater than or equal to the maximum session lifetime?" (S3b); and "Is there no traffic rate change for a time that is greater than or equal to the maximum session lifetime?" (S3c). If the answer to (S3); (S3a); (S3b); or (S3c) is no, then the speed limit 36 is increased (S5) and the process returns to (S2). If the answer to (S3); (S3a); (S3b); and (S3c) is yes, the method determines if the number of data points greater than or equal to minDataPoints (S4). If the answer to this is no, then the process returns to (S5). If the answer to (S4) is yes, then the method proceeds to apply linear regression to calculate a traffic rate/heap utilization slope (S6); calculate the maximum traffic rate that results in the heap utilization at a maximum heap percentage (S7); set maximum traffic rate in the speed limit 36 (S8); and if heap utilization is greater than maximum heap percentage, decrease speed limit 36 (S9).

Figure 4:
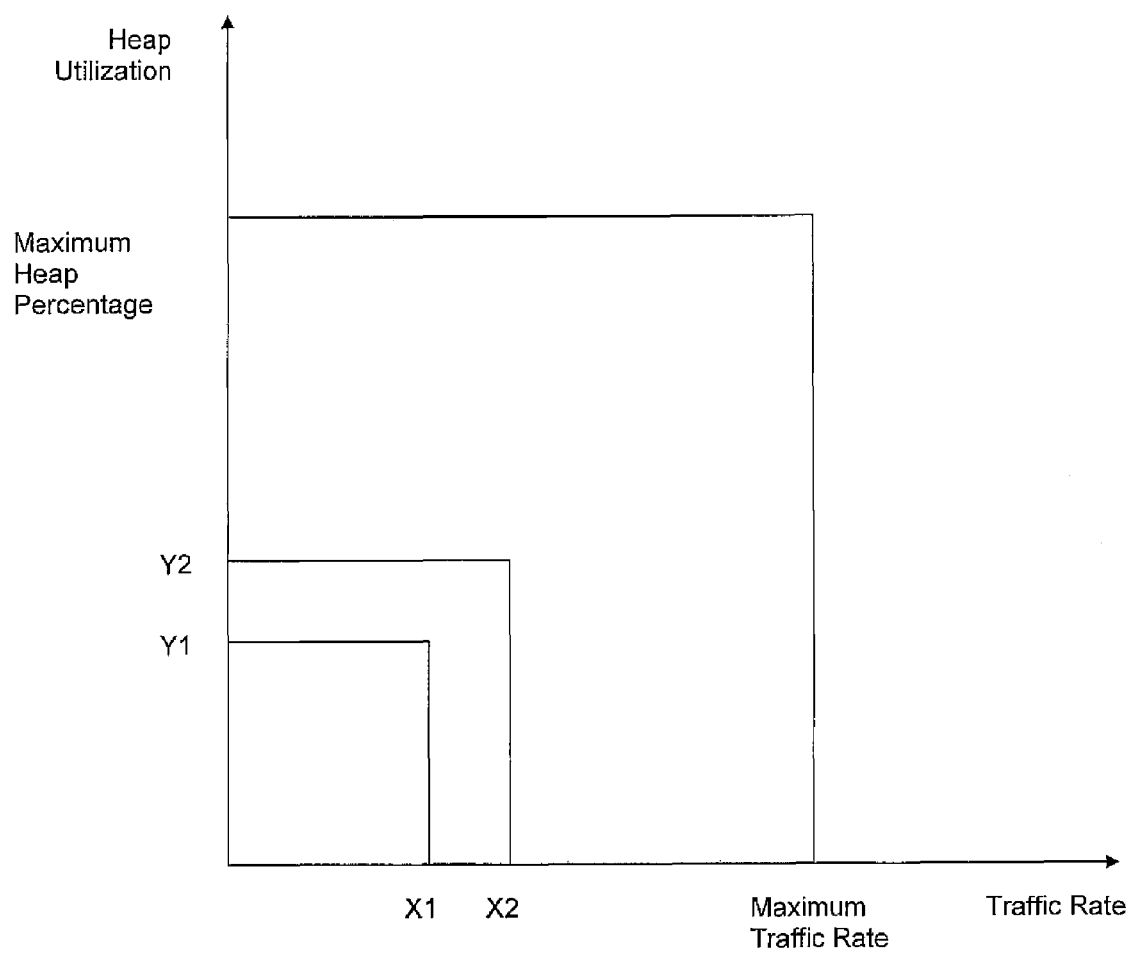
FIG. 4 is a graph depicting linear regression memory optimization for memory overload protection in accordance with the present invention.

Referring to FIG. 4, an example of linear regression for determining the maximum traffic rate given the maximum heap percentage and two data points is illustrated. An example of a linear regression that may be used in accordance with the invention is:

(maximum traffic rate−$X2$)/(maximum heap percentage−$Y2$)=($X2$−$X1$)/($Y2$−$Y1$)

maximum traffic rate−$X2$=($X2$−$X1$)/($Y2$−$Y1$)*(maximum heap percentage−$Y2$)

maximum traffic rate=($X2$−$X1$)/($Y2$−$Y1$)*(maximum heap percentage−$Y2$)+$X2$ A person skilled in the art will readily recognize that other linear regression models may be used as needed for specific applications of memory overload protection.

This invention addresses a server's optimized use of memory 22. The illustrated embodiment utilizes memory 22 allocated to a server 24 as a heap 46. A person skilled in the art will readily recognize this invention may be generalized to optimize allocations of memory 22 and other resources in computer systems. For example, memory overload protection as described by this invention may be used to optimize memory 22 allocated for a stack.

In one illustrative embodiment, this invention may be implemented in WebSphere Extended Deployment 6.1.0.3, in which the proxy server 12 comprises the "On Demand Router (ODR)" and the server 24 comprises the "WebSphere Application Server (WAS)".

Referring again to FIG. 2, it is understood that server 24 may be implemented as any type of computing infrastructure. Server 24 generally includes a processor 38, input/output (I/O) 40, memory 22, and bus 42. The processor 38 may comprise a single processing unit, or be distributed across one or more processing units in one or more locations, e.g., on a client and server. Memory 22 may comprise any known type of data storage, including magnetic media, optical media, random access memory (RAM), read-only memory (ROM), a data cache, a data object, etc. Moreover, memory 22 may reside at a single physical location, comprising one or more types of data storage, or be distributed across a plurality of physical systems in various forms.

I/O 40 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 42 provides a communication link between each of the components in the server 24 and likewise may comprise any known type of transmission link, including electrical, optical, wireless, etc. Although not shown, additional components, such as cache memory, communication systems, system software, etc., may be incorporated into server 24.

Access to server 24 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a server 24 comprising a memory overload protection system 20 could be created, maintained and/or deployed by a service provider that offers the functions described herein for customers.

It is understood that in addition to being implemented as a system and method, the features may be provided as a program product stored on a computer-readable medium, which when executed, enables server 24 to provide a memory overload protection system 20. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer readable medium according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

As used herein, an element or step recited in the singular and proceeded with the word "a" or "an" should be understood as not excluding plural elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A memory overload protection system, including a computer hardware device comprising:
a memory sensor system for determining how much dynamically allocated non-native memory is utilized by a server;
a session monitor system for determining a maximum session lifetime that encompasses a session lifetime of a configured percentile of at least one session, wherein a session lifetime comprises a length of time between allocation and de-allocation of said memory and said configured percentile comprises a percentage of all uses of said memory that are equal to or less than said maximum session lifetime;

a speedometer system for determining a traffic rate over the maximum session lifetime, wherein the traffic rate is comprised of an average traffic rate received from a proxy server and a variance of traffic rate received from the proxy server; and a memory overload controller for determining a maximum traffic rate, wherein the maximum traffic rate results in a maximum throughput rate while minimizing any memory allocation failures due to excessive memory usage.

2. The system of claim 1, wherein the memory sensor system reports a change in utilization of said allocated memory to the memory overload controller.

3. The system of claim 1, wherein the memory overload protection system sets a speed limit for the proxy server.

4. The system of claim 3, wherein the speed limit is calculated by monitoring a change in utilization of said allocated memory in response to a change in the traffic rate.

5. The system of claim 1, wherein the memory overload controller calculates a relationship between the traffic rate and utilization of said allocated memory to determine the speed limit.

6. The system of claim 5, wherein the memory overload controller increases the speed limit.

7. The system of claim 1, wherein the memory overload controller uses a linear regression to calculate a traffic rate/allocated memory utilization slope.

8. The system of claim 7, wherein the linear regression uses a fixed number of data points or a half-life algorithm to weigh a plurality of data points.

9. The system of claim 1, wherein the memory overload controller decreases the maximum traffic rate in response to notification from the memory sensor system that utilization of said allocated memory is greater than the allocated memory.

10. A method for memory overload protection, using at least one computer hardware device, the method comprising:
   determining how much dynamically allocated non-native memory is utilized by a server;
   determining a maximum session lifetime that encompasses a session lifetime of a configured percentile of at least one session, wherein a session lifetime comprises a length of time between allocation and de-allocation of said memory and said configured percentile comprises a percentage of all uses of said memory that are equal to or less than said maximum session lifetime;
   determining a traffic rate over the maximum session lifetime, wherein the traffic rate is comprised of an average traffic rate received from a proxy server and a variance of traffic rate received from the proxy server; and
   determining a relationship between the traffic rate and how much dynamically allocated non-native memory is utilized, wherein the determining generates a maximum traffic rate, wherein the maximum traffic rate results in a maximum throughput rate while minimizing any memory allocation failures due to excessive memory usage.

11. The method of claim 10, further comprising reporting a change in utilization of said allocated memory to a memory overload controller.

12. The method of claim 10, further comprising setting a speed limit for the proxy server.

13. The method of claim 10, further comprising calculating the relationship between the traffic rate and utilization of said allocated memory to determine the speed limit.

14. The method of claim 13, wherein determining the relationship between the traffic rate and utilization of said allocated memory uses a linear regression to calculate a traffic rate/utilization of said allocated memory slope.

15. A non-transitory computer readable medium storing a program product for memory overload protection, the computer program product comprising a computer readable storage medium having computer readable program code embodied therewith, the computer readable program code comprising: computer readable program code configured to determine utilization of dynamically allocated non-native memory of a server; computer readable program code configured to determine a maximum session lifetime that encompasses a session lifetime of a configured percentile of at least one session, wherein a session lifetime comprises a length of time between allocation and de-allocation of said memory and said configured percentile comprises a percentage of all uses of said memory that are equal to or less than said maximum session lifetime; computer readable program code configured to determine a traffic rate over the maximum session lifetime, wherein the traffic rate is comprised of an average traffic rate received from the proxy server and a variance of traffic rate received from the proxy server; and computer readable program code configured to determine a maximum traffic rate, wherein the maximum traffic rate results in a maximum throughput rate while minimizing any memory allocation failures due to excessive memory usage.

16. The non-transitory computer readable medium of claim 15, further comprising computer readable program code configured to report a change in utilization of said allocated memory to a memory overload controller.

17. The non-transitory computer readable medium of claim 15, further comprising computer readable program code configured to set a speed limit for the proxy server.

18. The non-transitory computer readable medium of claim 15, further comprising computer readable program code configured to calculate a relationship between the traffic rate and utilization of said allocated memory to determine a speed limit.

19. The non-transitory computer readable medium of claim 18, wherein the computer readable program code is configured to determine the relationship between the traffic rate and utilization of said allocated memory uses a linear regression to calculate a traffic rate/utilization of said allocated memory slope.

20. A method for deploying an application for providing memory overload protection, the method comprising:
   providing a computer infrastructure being operable to:
   determine how much dynamically allocated non-native memory is utilized by a server;
   determine a maximum session lifetime that encompasses a session lifetime of a configured percentile of at least one session, wherein a session lifetime comprises a length of time between allocation and de-allocation of said memory and said configured percentile comprises a percentage of all uses of said memory that are equal to or less than said maximum session lifetime;
   determine a traffic rate over the maximum session lifetime, wherein the traffic rate is comprised of an average traffic rate received from a proxy server and a variance of traffic rate received from the proxy server; and
   determine a relationship between the traffic rate and how much dynamically allocated non-native memory is utilized, wherein the determining generates a maximum traffic rate, wherein the maximum traffic rate results in a maximum throughput rate while minimizing any memory allocation failures due to excessive memory usage.

* * * * *